United States Patent
Kelly et al.

(10) Patent No.: US 10,364,994 B2
(45) Date of Patent: Jul. 30, 2019

(54) AIR HUMIDIFICATION AND/OR PURIFICATION

(71) Applicant: KONINKLIJKE PHILIPS N.V., Eindhoven (NL)

(72) Inventors: Declan Patrick Kelly, Eindhoven (NL); Weizhong Chen, Eindhoven (NL); Johan Marra, Eindhoven (NL); Cornelis Reinder Ronda, Eindhoven (NL); John Robert McGarva, Eindhoven (NL); Xuan Zhang, Eindhoven (NL); Jan Frederik Suijver, Eindhoven (NL); Jean-Paul Jacobs, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/763,130

(22) PCT Filed: Sep. 19, 2016

(86) PCT No.: PCT/EP2016/072089
§ 371 (c)(1),
(2) Date: Mar. 26, 2018

(87) PCT Pub. No.: WO2017/055113
PCT Pub. Date: Apr. 6, 2017

(65) Prior Publication Data
US 2018/0274804 A1    Sep. 27, 2018

(30) Foreign Application Priority Data

Sep. 30, 2015  (WO) ................ PCT/CN2015/091288
Nov. 16, 2015  (EP) ..................................... 15194715

(51) Int. Cl.
F24F 3/16    (2006.01)
F24F 6/06    (2006.01)
(Continued)

(52) U.S. Cl.
CPC .......... F24F 3/1603 (2013.01); B01D 53/346 (2013.01); B01D 53/83 (2013.01);
(Continued)

(58) Field of Classification Search
CPC ........ A61L 9/00; A61L 9/122; A61L 2202/14; A61L 2202/25; A61L 2209/11;
(Continued)

(56) References Cited

U.S. PATENT DOCUMENTS 3,325,973 A    6/1967  Illingworth
6,448,896 B1*  9/2002  Bankus .............. B01D 46/0086
                                                     340/607
(Continued)

FOREIGN PATENT DOCUMENTS

CN    101590268 A    12/2009
EP      2333441 A1     6/2011
(Continued)

*Primary Examiner* — Timothy C Vanoy

(57) ABSTRACT

The present application relates to an apparatus for purifying and/or humidifying air, and a related method for purifying and/or humidifying air. The apparatus comprises a rotary filter (1), a fan (9, 10) for passing air through the rotary filter (1), and a reservoir (4, 5), and wherein the rotation speed of the rotary filter (1) and the settings of the fan (9, 10) depend on the ambient relative humidity and ambient gas pollutant concentration. The apparatus combines the feature of chemisorption with the use of a rotary filter (1), thereby providing an apparatus which is able to purify air and/or regulate the ambient humidity based on humidity levels and levels of a target gas pollutant in the air. The invention removes the need for a pump for liquid transport, removes (Continued)

the need for frequent and expensive filter changes by the user, and instead only requires the user to periodically refresh the filtration solution in the reservoir (4, 5).

15 Claims, 7 Drawing Sheets

(51) Int. Cl.
    *F24F 11/00*     (2018.01)
    *F24F 11/30*     (2018.01)
    *B01D 53/34*     (2006.01)
    *B01D 53/83*     (2006.01)
    *F24F 110/20*     (2018.01)
    *F24F 110/50*     (2018.01)

(52) U.S. Cl.
    CPC .............. *F24F 6/06* (2013.01); *F24F 11/0008* (2013.01); *F24F 11/30* (2018.01); *F24F 2003/1617* (2013.01); *F24F 2006/065* (2013.01); *F24F 2110/20* (2018.01); *F24F 2110/50* (2018.01); *Y02A 50/21* (2018.01)

(58) Field of Classification Search
    CPC ............. A61L 2209/14; A61L 2209/22; B01D 33/0006; B01D 33/15; B01D 37/025; B01D 37/04; B01D 46/0036; B01D 46/0038; B01D 46/0056; B01D 46/26; B01D 46/44; B01D 2221/16; B01D 2258/06; B01D 2259/4508; B01D 2279/40; B01D 2279/65; F24F 3/1603; F24F 6/06; F24F 11/0008; F24F 2003/1617; F24F 11/30; F24F 2110/20; F24F 2110/50; Y02A 50/21

See application file for complete search history.

(56) References Cited

U.S. PATENT DOCUMENTS

2009/0188218 A1*   7/2009   Pippel ............... B01D 46/0005
                                                                                    55/383
2014/0216259 A1     8/2014   Iwaki

FOREIGN PATENT DOCUMENTS

| JP | 0367832 A | 3/1991 | |
|---|---|---|---|
| WO | WO 2007019535 A2 * | 2/2007 | ......... B01D 46/0036 |
| WO | 2007062471 A1 | 6/2007 | |
| WO | WO 2007019535 A3 * | 8/2007 | ......... B01D 46/0036 |
| WO | 2009109977 A2 | 9/2009 | |
| WO | 2013128350 A1 | 9/2013 | |
| WO | 2016097027 A1 | 6/2016 | |

\* cited by examiner

AIR HUMIDIFICATION AND/OR PURIFICATION

This application is the U.S. National Phase application under 35 U.S.C. § 371 of International Application No. PCT/EP2016/072089, filed on Sep. 19, 2016, which claims the benefit of International Application No. PCT/CN2015/091288 filed on Sep. 30, 2015 and International Application No. 15194715.7 filed on Nov. 16, 2015. These applications are hereby incorporated by reference herein.

FIELD OF THE INVENTION

The invention relates to the field of air treatment, and in particular to air humidification and/or purification using a rotary filter, a fan and a filtration solution.

BACKGROUND OF THE INVENTION

Indoor air quality has an impact on the population's health and comfort. Indoor air pollution is a significant risk factor that may lead to multiple health problems, while people are increasingly spending time indoors. By applying the right air purification and/or humidification system the adverse effects of a poor indoor air quality can be minimized.

Indoor air pollutants are principally composed of three groups: particulate matter that include fine particles, tobacco smoke and radioactive particles; gases and vapors that include volatile organic (VOC) and inorganic compounds; and biological contaminants that include microorganisms such as fungi, spores, bacteria and viruses. Exposure to VOCs, in particular, may cause adverse health effects such as irritation of the eyes, skin, and respiratory tract and may also lead to more serious diseases including cancer and leukemia.

Common methods of controlling indoor air pollution and improving indoor air quality include controlling pollution sources, increasing the air exchange (ventilation) rate, and using air purifiers and air humidifiers. The use of air purifiers to eliminate indoor air pollutants is becoming increasingly popular. Traditional air purifiers use filters to remove particulate matters or use sorption materials (e.g., granular activated carbon) to adsorb polluting gases and/or odors from air.

Among the polluting gaseous compounds, the presence of formaldehyde gas has been identified as a particular risk. Formaldehyde is toxic, allergenic, and carcinogenic. At concentrations above 0.1 ppm in air, formaldehyde can irritate the eyes and mucous membranes, resulting in watery eyes. Inhaled formaldehyde at and above this concentration may cause headaches, a burning sensation in the throat, difficulty with breathing, and can trigger or aggravate asthma symptoms.

However, unlike other indoor volatile organic compounds that can be effectively removed by porous sorbent media via physical adsorption, formaldehyde cannot be satisfactorily removed by pure sorbent media due to its relatively low boiling point (−19.3° C. [−2.74° F.]) and thus high volatility. The VOC adsorption ability of activated carbon decreases for gases with decreasing boiling points: gases with boiling temperatures above room temperature can relatively easily be absorbed by activated carbon, while gases with boiling temperatures below room temperature are only moderately or poorly adsorbed.

To overcome the problems associated with the use of activated carbon, chemisorption filters may be employed. Such filters comprise specific chemical species that are impregnated in a porous substrate. The impregnated substrate may then be located as a chemisorption filter in an air purifier. The impregnated chemical species may react with formaldehyde. Chemical species capable of absorbing formaldehyde gas from air are principally organic amines. The reaction between the organic amine and formaldehyde is illustrated in Equation 1. After formaldehyde has reacted with the organic amine, it becomes a non-volatile compound that remains in the filter and is thereby removed from the air.

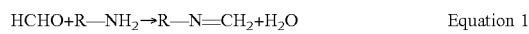

$$HCHO+R-NH_2 \rightarrow R-N=CH_2+H_2O \qquad \text{Equation 1}$$

The absorption performance of a chemisorption filter can be affected by the relative humidity (RH) of the air. In general, the filter's absorption capacity and one-pass absorption efficiency towards formaldehyde decreases with a decreasing RH, particularly so when the RH<30%. In dry air at RH<30%, the filter's air cleaning performance towards formaldehyde may therefore become unsatisfactory. It is therefore desirable to maintain the ambient RH at RH>30%. This is possible by wetting the chemisorption filter with water or with an aqueous chemical solution capable of absorbing formaldehyde from air.

The use of a fixed wetted filter in combination with an aqueous chemical solution for air cleaning is disclosed in WO2013128350A1/CN 104067060 A. The document describes a system including a fixed filter structure that is irrigated on its top with the chemical solution by means of a pump. When a polluting gas in air passes through the filter, the gas reacts with the chemical inside the filter structure and it is thereby removed from the air. The described fixed wetted filter can simultaneously act as a humidifying filter, which can be used to prevent the relative humidity (RH) of the ambient air from becoming too low to allow a satisfactory air cleaning performance towards the polluting gas. However, such a system requires a pump for enabling the filter wetting with the aqueous chemical solution, which can be noisy and costly, and may require periodic replacement, as well as periodic replacement of the filter, which is inconvenient and costly.

SUMMARY OF THE INVENTION

It is an object of the invention to provide an apparatus and method for humidifying and/or purifying air, which substantially alleviates or overcomes the problems mentioned above. The invention is defined by the independent claims. The dependent claims define advantageous embodiments.

According to the present invention, there is provided an apparatus for humidifying and/or purifying air comprising a rotary filter, e.g. a rotatable air-permeable rotary filter, a fan for passing air through the air-permeable rotary filter, and a reservoir. The reservoir is suitable for containing a filtration solution. When a filtration solution is provided in the reservoir, the air-permeable rotary filter is in communication with the filtration solution. Thus, the rotary filter is partly located in the reservoir such that the rotary filter passes through the reservoir when it rotates. Due to its location, the rotary filter passes through the filtration solution when the solution is provided in the reservoir. The rotation speed of the rotary filter and settings of the fan depend on the ambient relative humidity. In other words, the settings of the fan, e.g. velocity of the air flow produced by the fan, and the rotation speed of the rotary filter are controlled by feedback from a humidity sensor. The humidity sensor may be part of the apparatus. Alternatively, the apparatus comprises components, e.g. wireless components, for receiving data from a humidity sensor external to the apparatus. Further, the settings of the fan, e.g. velocity of the air flow produced by the fan, and the rotation speed of the rotary filter are further controlled by feedback from a gaseous pollutant sensor. The gaseous pollutant sensor may be part of the apparatus. Alternatively, the apparatus comprises components, e.g. wireless components, for receiving data from a gaseous pollutant sensor external from the apparatus.

According to an embodiment of the invention, the apparatus comprises a controller that is coupled wired or wirelessly to a humidity sensor and a gas pollutant sensor. The controller is configured to adapt settings of the fan and the rotary filter or the motor driving the rotary filter depending on humidity and gas pollutants sensed by respectively the humidity and the gas pollutant sensor. For example, the controller is configured to start or stop rotation of the rotary filter. For example, the controller is configured to activate or deactivate the fan.

In some embodiments, the reservoir comprises a single part, into which the user introduces filtration solution, either in situ, or by removing the reservoir from the apparatus filling it, and replacing it. In alternative embodiments, the reservoir comprises at least two parts, wherein a first part ('tray') holds the filtration solution with which the air-permeable rotary filter is contact; and a second part ('tank') holds the unused filtration solution and releases it as required into the tray. This allows the user to remove the tank independently of the tray and other features of the apparatus, in order to easily refresh or replace the filtration solution.

In some embodiments wherein the reservoir comprises a tray and a tank, the reservoir comprises a mechanism for maintaining a substantially consistent amount of filtration solution in the tray, thereby allowing the filtration solution in the tray to be maintained at a substantially optimal level for operation of the apparatus. The mechanism may be any suitable mechanism. For example, the reservoir may comprise a level control switch which, by means of a control system, is linked to a pump or valve to controllably release the filtration solution from the tank into the tray. In some embodiments, the control system may comprise a passive level control.

In some embodiments, the filtration solution may be an aqueous solution. In some embodiments, the filtration solution may be water. In alternative embodiments, the composition of the filtration solution may be tailored for a specific pollutant(s). For example, the filtration solution may comprise an alkanol-amine, and one or both of a bi-carbonate salt and a humectant. In some embodiments, the filtration solution comprises tris-hydroxymethyl-aminomethane, and one or both of $KHCO_3$ and potassium-formate. In some embodiments, the amount of alkanol-amine in the filtration solution is no more than 25% w/w or no more than 20% w/w and/or the amount of bi-carbonate salt is no more than 15% w/w.

In some embodiments, the rotary filter comprises one or more hydrophilic materials. In some embodiments, the rotary filter comprises one or more of ceramics, hydrophilic polymeric materials, hydrophilic fibrous materials, or hydrophilic paper.

In some embodiments, the air-permeable rotary filter has a large contact surface area with air, for example at least 0.1 $m^2$. In some embodiments, the rotary filter has a corrugated or honeycomb structure. In some embodiments, the corrugated or honeycomb structure comprises a plurality of open channels for air passage. Preferably, the open channels are substantially straight. Preferably, the open channels have a length of at least 10 mm. Preferably the diameter of the open channels is in the range 0.5 mm-2 mm.

In some embodiments, the apparatus further comprises a rotatable frame, with which the rotary filter is in communication. In some embodiments, the rotatable frame comprises one or more buckets, which contact the filtration solution in use.

In some embodiments, the apparatus is for humidifying air. In some embodiments, the apparatus is for purifying air. In some embodiments, the apparatus is for humidifying and purifying air. In some embodiments the air purification and humidification is substantially simultaneous. In some embodiments, the function performed by the apparatus depends upon the ambient relative humidity.

According to an embodiment of the invention, the rotary filter is a chemisorption filter.

According to an embodiment of the invention, the rotary filter is controlled to rotate if the level of a gaseous pollutant sensed by the gaseous pollutant sensor is above a pre-set level which is not acceptable to the user. In such a situation, to ensure high performance of e.g. a chemisorption filter, the filter must be periodically wetted with a filtration solution present in the reservoir. Thus, the rotary filter must be controlled to rotate.

According to an embodiment of the invention, the apparatus comprises a user reminder mechanism for indicating when to refill the reservoir or renew a filtration solution in the reservoir, and wherein the user reminder mechanism is activated when a gaseous pollutant level sensed by the gaseous pollutant sensor is above a pre-set level for a pre-set amount of time. The gaseous pollutant levels above this pre-set level are for example not acceptable for the user.

According to an embodiment of the invention, the rotary filter is controlled to rotate and the fan is controlled to produce an air flow when an ambient relative humidity level received from the humidity sensor is below a pre-determined humidity value. In this situation, air purification and humidification are performed. Because humidification is required, the fan and the rotary filter are activated. The pre-determined humidity value may be a lowest acceptable humidity level for the user. The value may be entered by the user via a user interface of the apparatus.

According to an embodiment of the invention, the rotary filter is controlled to intermittently rotate and the fan is controlled to continuously produce an air flow when the ambient relative humidity level received from the humidity sensor is above the pre-determined humidity value, and when a gaseous pollutant concentration level received from the gaseous pollutant sensor is above a pre-determined gas pollutant level. In this situation, humidity levels are acceptable (above the pre-determined humidity value) but the gas pollutant concentration level is not acceptable (above the pre-determined gas pollutant level or concentration in the room) and thus only air purification is necessary. However, for high performance purification with a chemisorption filter, the rotary chemisorption filter must be controlled to at least intermittently rotate such that it is periodically wetted with fresh filtration solution. Intermittent rotation of the chemisorption filter also saves power and increases the lifetime of the motor driving the rotary filter. The pre-determined gas pollutant level may be a highest acceptable gas pollutant level for the user. The value may be entered by the user via a user interface of the apparatus. The value may also be entered by the user via software running on a device which is wirelessly connectable to the apparatus, for example an app running on a smartphone.

According to an embodiment of the invention, the rotary filter is controlled to stop rotating and the fan is controlled to be deactivated when the ambient relative humidity level received from the humidity sensor is above the pre-determined humidity value and when the gaseous pollutant concentration level received from the gaseous pollutant sensor is below the pre-determined gas pollutant level. In this situation, actual humidity levels and gas pollutant levels in the room are acceptable. To save power and increase the lifetime of the apparatus' components, the rotary filter stops rotating and the fan is deactivated.

In the embodiments described above, humidity levels below the pre-determined humidity value are not acceptable to the user and gas pollutant levels above the pre-determined gas pollutant level are not acceptable. In both cases, adequate action can automatically be taken by the apparatus.

According to the present invention, there is also provided a method of purifying and/or humidifying air. The method comprises: providing an apparatus comprising a rotatable air-permeable rotary filter, a fan for passing air through the rotary filter, and a reservoir comprising a filtration solution, wherein the air-permeable rotary filter is in communication with the filtration solution; and rotating the rotary filter, thereby depositing filtration solution onto the rotary filter and dispersing the deposited filtration solution through the interior of the rotary filter; wherein the rotation speed of the rotary filter is dependent upon the ambient relative humidity.

In other words, the method for purifying and/or humidifying air comprises: rotating a rotary filter, thereby depositing a filtration solution onto the rotary filter and dispersing the deposited filtration solution through the interior of the rotary filter; passing air through the rotary filter; and controlling a rotation speed of the rotary filter and the air flow through the rotary filter in dependence upon an ambient relative humidity; controlling a rotation speed of the rotary filter and the air flow through the rotary filter is further dependent upon a gaseous pollutant concentration in the ambient air.

Airborne pollutants are removed and/or the air humidity is regulated by exposure of the ambient air to the filtration solution located on and inside the rotary filter. In some embodiments, the rotation speed of the air-permeable rotary filter is no more than 2 revolutions per minute (rpm). In some embodiments, the air flow through the rotary filter is around 1 m/s.

In some embodiments the apparatus further comprises a rotatable frame with which the rotary filter is in communication, wherein the frame comprises one or more buckets. In such embodiments, the frame, and thereby the rotary filter, are rotated, and the bucket(s) contact and collect some of the filtration solution. The filtration solution is deposited on the rotary filter as the frame continues to rotate, and disperses through the interior of the rotary filter.

In some embodiments, the method is a method of humidifying air. In alternative embodiments, the method is a method of purifying air. In some embodiments, the method is a method of purifying and humidifying air. In some embodiments the air purification and humidification is substantially simultaneous.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Throughout the description reference is made to "filtration solution". This is a solution that may be used to wet a chemisorption filter. By wetting the filter, a high-performance chemisorption of polluting gas from air is ensured, even under conditions of a low ambient relative humidity.

The present invention advantageously combines the feature of chemisorption with the use of a wetted air-permeable rotary filter, thereby providing an apparatus which is able to both purify the air and regulate the relative humidity of the air.

Wetting of the air-permeable rotary filter is achieved by deposition of the filtration solution onto the air-permeable rotary filter as a result of rotation of the rotary filter, followed by effective dispersal of the filtration solution through the air-permeable rotary filter. In some embodiments, the deposited filtration solution disperses throughout substantially the entire volume of the air-permeable rotary filter. This wetting system allows the apparatus to achieve a high-performance chemisorption of polluting gas from air, even under conditions of a low ambient relative humidity.

The degree of wetting of the rotary filter can be controlled, in part, by controlling the speed of rotation of the rotary filter.

When the air is particularly dry, the rate of air humidification and air cleaning can be increased by increasing the rotational speed of the rotary filter. This increases the rate of rotary filter wetting, thereby increasing the rate of moisture evaporation from the filter into air.

Under conditions of high relative ambient humidity, wetting of the air-permeable rotary filter can be terminated by termination of rotation of the air-permeable filter. Airflow through the rotary filter, generated by the fan, may then be continued, and the filter thus dries. Drying of the rotary filter stops air humidification, while the chemical species capable of absorbing ambient polluting gas(ses) are retained inside the rotary filter, thereby maintaining the air purification functionality of the apparatus.

When neither air humidification nor air purification is needed, both the airflow through the filter, as generated by the fan, and rotation of the air-permeable rotary filter are terminated.

In preferred embodiments, the rotational speed of the filter depends upon the ambient relative humidity.

The invention removes the need for frequent and expensive filter changes by the user, and instead requires the user to only periodically refresh or replace the filtration solution.

The invention also removes the need for a pump for transporting the filtration solution to the filter.

Figure 3A:
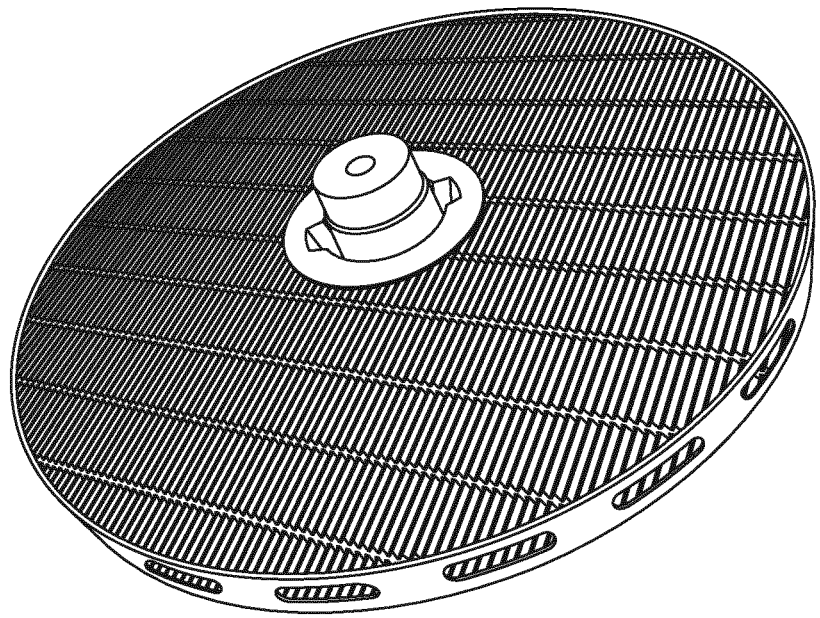
FIG. 3a shows an air-permeable rotary filter according to one embodiment of the invention.
Figure 3B:
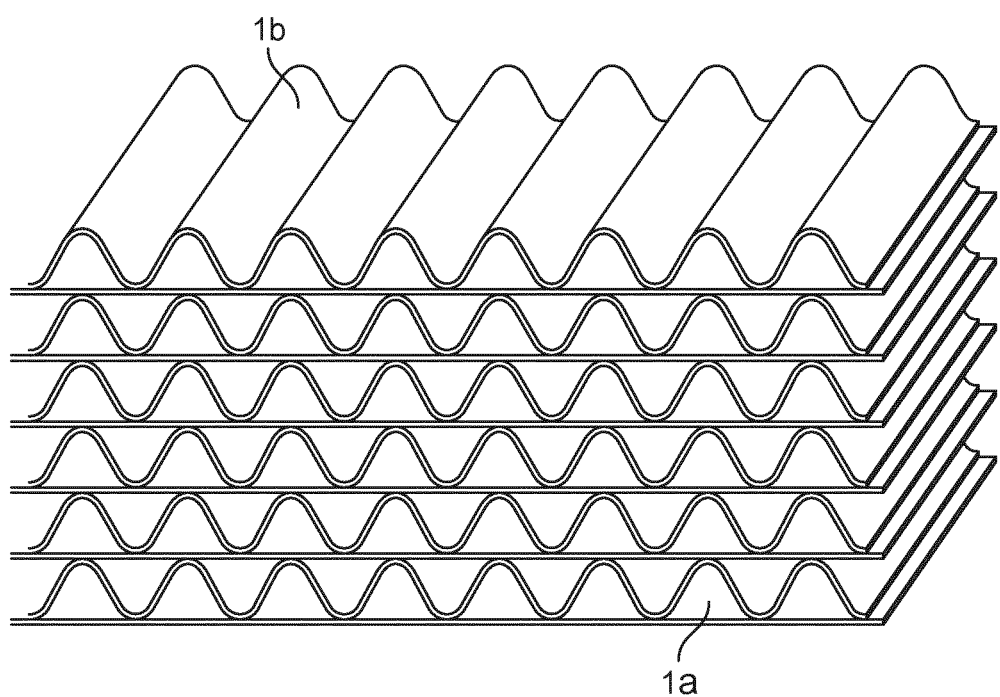
FIG. 3b shows a schematic cross-sectional view of an air-permeable rotary filter according to one embodiment of the invention.

The rotary filter may be made of any suitable construction or structure. Advantageously, the rotary filter is constructed in such a way that it provides a large contact surface area with air, whilst incurring only a relatively low pressure drop when a fan passes an airflow through the filter. For example, the rotary filter may possess a honeycomb structure or a corrugated structure with a plurality of parallel open channels for air passage as shown in FIGS. 3a and 3b. FIG. 3b shows the open channels (1a) and corrugations (1b) in the rotary filter. The rotary filter may have a surface area of at least 0.1 $m^2$, at least 0.2 $m^2$, at least 0.3 $m^2$, or at least 0.4 $m^2$.

In preferred embodiments, the pore diameter of the air channels or other surface area-increasing features of the rotary filter is between 0.2 mm and 5 mm, more preferably between 0.3 mm and 3 mm, even more preferably between 0.4 mm and 2.5 mm, and most preferably between 0.5 mm and 2 mm.

In preferred embodiments, the air channels are substantially straight.

In preferred embodiments, the air channels have a length of at least 10 mm. This helps to ensure a sufficiently long residence time of air inside the channels when a flow of air is passed through the filter for air pollutants to be absorbed. A residence time of at least 5-10 ms is required to enable a satisfactory degree of air cleaning and/or air humidification to be accomplished. During the residence time of air in the air channels of the rotary filter, air cleaning occurs via diffusional transport of polluting gas to the air channel walls where the gas reacts with the chemisorbing species comprised in the air channel walls. Simultaneously, air humidification occurs via diffusional transport of moisture from the wet air channel walls into air. The air channel length substantially corresponds to the filter thickness.

The rotary filter may be made of any suitable material. Advantageously, the rotary filter comprises one or more hydrophilic materials, such as ceramics, hydrophilic polymeric materials, hydrophilic fibrous materials, or hydrophilic paper. By comprising hydrophilic materials in the filter structure, a rapid dispersion of deposited filtration solution on the rotary filter may be achieved. In addition, rapid dispersion of deposited filtration solution on the rotary filter is facilitated throughout the filter structure, driven by the forces of capillarity, hydration, and gravity.

In preferred embodiments, the walls of the air channels comprise hydrophilic materials that are permeable to filtration solution but substantially impermeable to air passage. In this way, filtration solution can conveniently be drawn into and contained inside the porous hydrophilic air channel walls, thereby becoming directly and intimately exposed to air passing through the air channels. The intimate exposure and the overall large surface area of the channel walls in the rotary filter structure facilitate a rapid transfer of moisture from the filtration solution in the channel walls into the air. Simultaneously, a very effective transfer of polluting gas from the air to the gas-absorbing filtration solution in the channel walls is accomplished. This results in an efficient rate of air humidification and/or air cleaning.

The air-permeable rotary filter shown in FIG. 3a is a pleated structure of PET and Rayon.

The filtration solution may comprise any agent suitable for use in an air purification or air humidification system. In some embodiments, the filtration solution may be an aqueous solution. In some embodiments, the filtration solution may be water. In some embodiments, the composition of the filtration solution may be tailored for a specific pollutant(s), such as acidic gaseous pollutants, or volatile organic compounds such as formaldehyde, benzene, methylene chloride. For example, an aqueous alkaline filtration solution, such as an aqueous solution comprising (bi-)carbonate salts (e.g., $NaHCO_3$, $KHCO_3$, $K_2CO_3$) or hydroxide salts (e.g., KOH, NaOH), would help to effectively clean the air from acidic gaseous pollutants such as $SO_2$ and carboxylic acids like acetic acid and formic acid. Alternatively, a filtration solution which is intending to remove formaldehyde from the atmosphere may comprise an alkanol-amine such as tris-hydroxymethyl-aminomethane, either alone, or together with a bi-carbonate salt such as $KHCO_3$ and a humectant such as potassium-formate. Preferably, the amount of tris-hydroxymethyl-aminomethane in a filtration solution is no more than 25% w/w. Preferably, the amount of potassium bicarbonate in a filtration solution is no more than 15% w/w.

In some embodiments, the filtration solution may also have disinfectant properties, for example due to the concentration level of salt(s) in the solution which, by itself, prevents the growth and survival of microorganisms. In alternative embodiments, one or more disinfectant agents may be added to the filtration solution. Disinfectant agents which are suitable for use in an air purification system or an air humidifier may be used, and include agents such as propolis and fluorides. The presence of a disinfectant in the filtration solution confers the advantage that the features of the apparatus in contact with the filtration solution, including the air-permeable rotary filter, will not become a source of micro-organisms. This may help to inactivate, amongst others, micro-organisms associated with the apparatus.

In some embodiments, the apparatus is provided as an appliance, wherein the apparatus is located within a housing which comprises means for activating and deactivating the apparatus. In some embodiments, the appliance or housing is provided with a user interface, to allow selection of the desired function (air purification and humidification; air purification only; air humidification only, or selection of function as dependent upon ambient RH values). In some embodiments, selection of the desired function(s) is done by an app which is, for example, controlled by a user. For example, an app running on a smartphone of the user.

In some embodiments, the apparatus or appliance further comprises a user reminder mechanism, such as the illumination of a light on the apparatus or any housing in which it is inserted or encased, or the activation of a sound, or the activation of an alert within an app running on a smartphone of the user, in order to indicate to the user when to refill the tank or renew the filtration solution. In some embodiments this may be effected via a sensor and an algorithm, as provided, for example, by a suitably programmed computer.

In some embodiments, the apparatus can be used substantially only as an air humidifier. To operate the apparatus as a humidifier only, the rotary filter is required to be maintained in a wetted state by maintaining rotation of the rotary filter, thereby maintaining wetting of the rotary filter with a filtration solution from the reservoir. The filtration solution comprises water, and, in some embodiments, may comprise one or more agents for removal of gaseous pollutant(s). In some embodiments, the fan speed and rotary filter rotation speed are controlled by means of a humidity sensor, which uses the set-point ambient relative humidity levels $RH_{max}$ and $RH_{min}$. In preferred embodiments, a measured $RH \geq RH_{max}$ triggers the appliance to stop both the rotary filter rotation and the fan-driven airflow. This ceases wetting of the rotary filter with filtration solution, substantially stops the transfer of moisture from the filter into the ambient air, and thus prohibits further air humidification. In preferred embodiments, a measured $RH \leq RH_{min}$ triggers the appliance to start both rotation of the rotary filter and activates the airflow through the rotary filter via the fan. This enables wetting of the rotary filter with water, enables moisture transfer from the filter into the airflow passing through the filter, thus realizing air humidification. Preferred values for the set-point RH levels are $RH_{min}=35\%$ and $RH_{max}=65\%$. The user would be reminded to add water to the reservoir when required.

In some embodiments, the appliance is set so that no air humidification is needed within the ambient RH range $RH_{min}<RH<RH_{max}$. Both the fan and the filter rotation motor can remain OFF in the latter RH range.

By making the rotation speed of the air-permeable rotary filter dependent on the ambient relative humidity, it becomes possible to adjust the amount of evaporated moisture and the evaporation rate to the ambient relative humidity. Specifically, by stopping the rotation when the relative humidity exceeds a maximum set-point level $RH_{max}$, the wetting of the rotary filter with filtration solution is terminated. This quickly leads to drying of the rotary filter, which ends the air humidification (even when the airflow through the rotary filter continues) and prevents the occurrence of an uncomfortably high ambient relative humidity level. By starting rotation of the rotary filter and thus rotary filter wetting when the ambient relative humidity falls below a minimum set-point level $RH_{min}$, air humidification becomes initiated only when needed for preventing the air to become too dry. When the ambient relative humidity falls well below $RH_{min}$, the rotation speed and thereby the rate of filter wetting can be increased to increase the rate of air humidification.

In alternative embodiments, the apparatus can be used substantially only as an air purifier. To operate the apparatus as a purifier only, air is continuously passed through the air-permeable rotary filter via activation of the fan, irrespective of the ambient RH level. In such embodiments, rotation of the rotary filter occurs periodically (for example only for a few minutes every day (for example for less than 10, 8, 5, 3, 2 or 1 minute) in order to periodically wet the rotary filter briefly with the filtration solution, thereby ensuring the timely replacement/regeneration of the initially dissolved chemical species in the filtration solution on and inside the rotary filter. Once rotation of the rotary filter ceases, the apparatus operates as an air purification device only, as air is passed through the rotary filter by the fan, and water from the filtration solution which is located inside the rotary filter evaporates until the filter is dry, thereby leaving only the initially dissolved chemical species behind inside the rotary filter. The chemical species inside the filter continue to chemisorb gaseous pollutants from the airflow. In the air purification mode, the ON/OFF and speed settings of the fan can be controlled by means of feedback from a sensor capable of measuring in air the concentration of the gaseous pollutants that can be absorbed by the active chemical species in the filtration solution. The user would be reminded to add filtration solution and/or water in the reservoir on a periodic basis by means of a reminder mechanism.

To act as an air humidifier and an air purifier, the settings of the fan and the filter rotation speed are controlled by feedback from, for example, both a humidity sensor and a gaseous pollutant sensor. In preferred embodiments, the apparatus is set to maintain a level of atmospheric humidity of around RH 50%, as the performance of a chemisorption filter may, as discussed above, be significantly affected by the relative humidity, and maintenance of an ambient humidity level of around 50% ensures effective adsorption of pollutants such as formaldehyde. The functionalities of the apparatus towards both air humidification and air purification are thus activated based upon measured values of the RH and the gaseous pollutant concentration in the ambient air.

The one-pass removal efficiency of pollutant(s) from air (i.e., the accomplished percentage removal of pollutants when passing the air once through the filter) depends on parameters such as the air flow rate through the air-permeable rotary filter, the rotary filter design parameters, and the concentration of the filtration solution. Typically, the higher the air/filter contact surface, the higher the one-pass removal efficiency. For example, the one-pass efficiency can be up to 70-90% for formaldehyde removal if the air flow is around 1 m/s, filter surface is >0.1 $m^2$, and the organic amine solution concentration is around 20% w/w. Change of any of the parameter will result in a change of removal efficiency.

As an example, a one-pass formaldehyde removal efficiency of more than 90% can be achieved with a superficial air velocity $v_s \leq 1$ m/s at the filter face when using a rotary corrugated filter composed of a hydrophilic paper-like material wherein the air channels are 0.5-2 mm in diameter and ≥10 mm in length; the corrugation pitch is ≥3 mm; and the air channel walls are ≤1 mm thick, and when the porous air channel walls comprise filtration solution wherein tris-hydroxymethyl-aminomethane is dissolved at a ≥5% w/w concentration.

In preferred embodiments, the rotation speed of the air-permeable rotary filter is such that flooding of the air-permeable parts (e.g., the air channels) of the rotary filter is avoided, yet the rotary filter remains wet in all positions during revolution of the frame, so as to avoid local drying of the rotary filter and thus local accumulation of, for example, salts. It was found that this can be accomplished with a rotary filter possessing a 0.1 $m^2$ face area by limiting its rotation speed to 2 rpm or less, the rotation speed decreasing at increasing RH of the ambient air. In alternative embodiments, the rotation speed of the rotary filter can be controlled and adjusted via a duty cycle wherein short periods of rotary filter rotation/wetting are separated by longer periods wherein no rotary filter rotation occurs and wherein excess filtration solution is allowed to drain from the rotary filter back into the reservoir or tray, and wherein the moisture from the remainder of the filtration solution inside the filter evaporates into the air passing through the filter.

As discussed above, in some embodiments, the apparatus and/or appliance comprises a user reminder mechanism in order to indicate to the user when to refill the tank or renew the filtration solution. In some embodiments the reminder may relate to the total volume of air that has passed through the filter since the last renewal of the filtration solution. The total displaced air volume through the filter during a set period of time is readily derived from the air flow settings of the apparatus during the set period of time. When the total displaced air volume exceeds a pre-set level, a reminder mechanism is thus activated to signal to the user that the filtration solution is to be replaced with a fresh filtration solution. In alternative embodiments, the apparatus may comprise a formaldehyde gas sensor, which activates a mechanism which causes the rotary filter to rotate if the level of formaldehyde in the ambient air is above a pre-set level, thereby wetting the rotary filter. If the formaldehyde concentration registered by the sensor then remains above the pre-set level, the sensor activates a reminder mechanism, alerting the user that the filtration solution requires replacing. Alternatively, such a reminder may comprise a mechanism for detecting when the filtration solution is below a pre-set level. For example, the reminder mechanism may be a magnet, mounted in a float, in the reservoir or tray. When the level of filtration solution drops, the float also drops its position, and, when the filtration solution reaches a pre-set level, the magnet sends a signal to a reed switch. The reed switch then communicates with a control system, for example via an algorithm, as provided by a suitably programmed computer, to signal an alert to the user.

Figure 1:
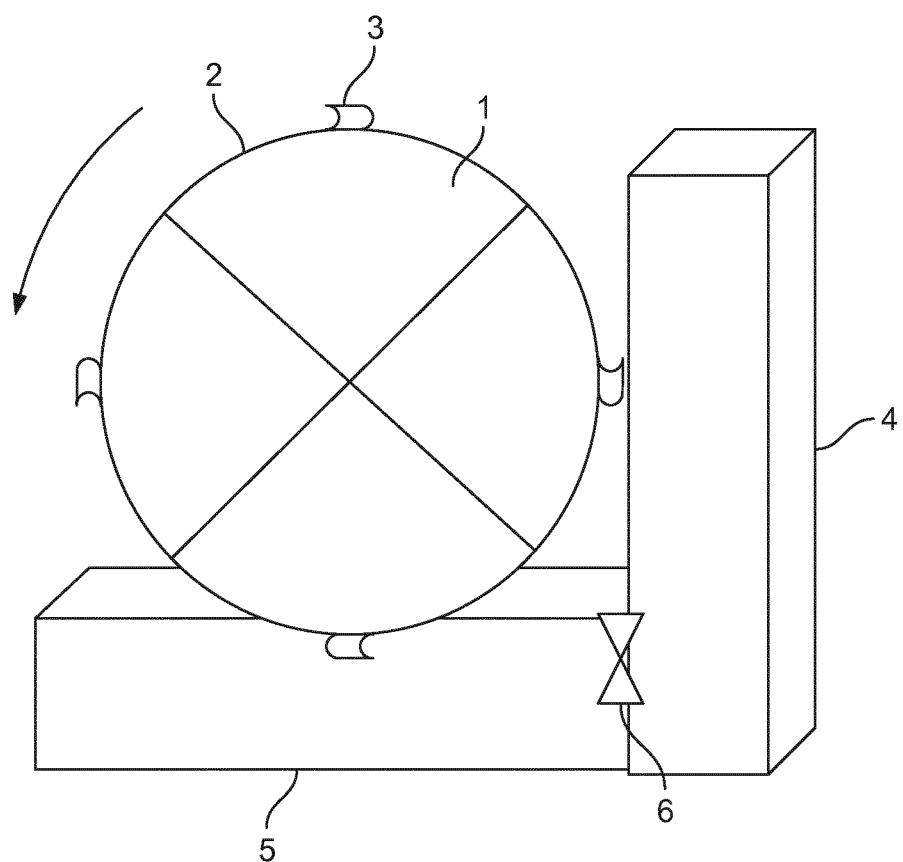
FIG. 1 shows a schematic view of one embodiment of the apparatus according to the invention.

FIG. 1 shows a schematic view of one embodiment of the apparatus according to the invention. The apparatus comprises an air-permeable rotary filter 1, housed within a frame 2, which comprises one or more buckets 3, a tank 4 and a tray 5. A filtration solution is located in the tray 5, and is replenished by filtration solution from the tank 4 via a passive level control valve 6. The arrow indicates rotation of the rotary filter in use.

The term "bucket" as used herein denotes any means which is suitable for collecting filtration solution from the reservoir, transporting the filtration solution beyond at least the lowest point of the frame, and depositing the filtration solution substantially over or substantially within the rotary filter.

Figure 2:
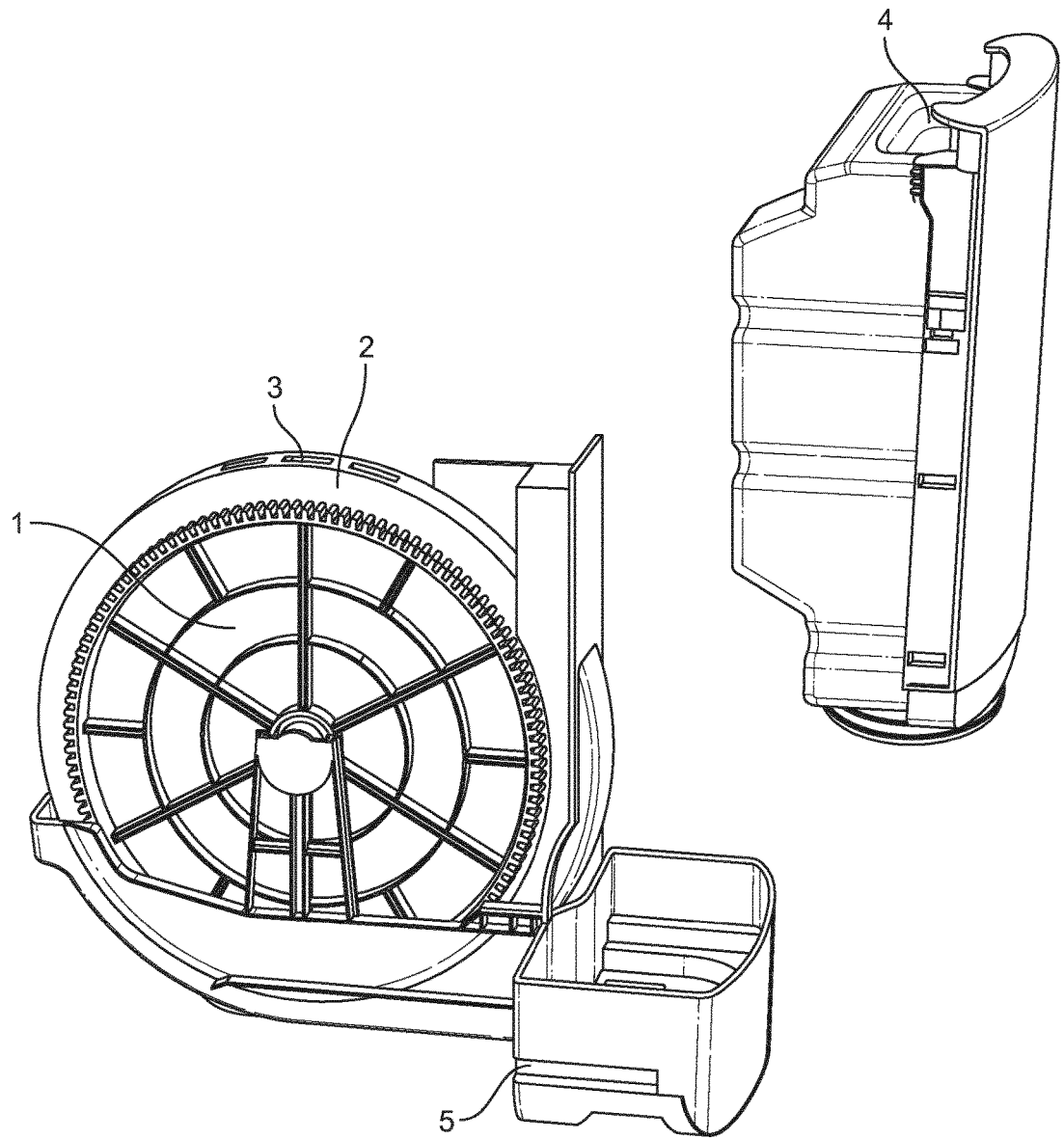
FIG. 2 shows a schematic view of one embodiment of the apparatus according to the invention.

As shown in FIG. 2, the tank 4 is detachable from the tray 5. Advantageously, the rotary filter 1 is positioned above the tray 5 at an appropriate height so that the buckets 3 on the frame 2 scoop up a volume of the filtration solution when they rotate to the bottom position. As the buckets 3 then rotate to the top position, the filtration solution is deposited onto the rotary filter 1.

Figure 4:
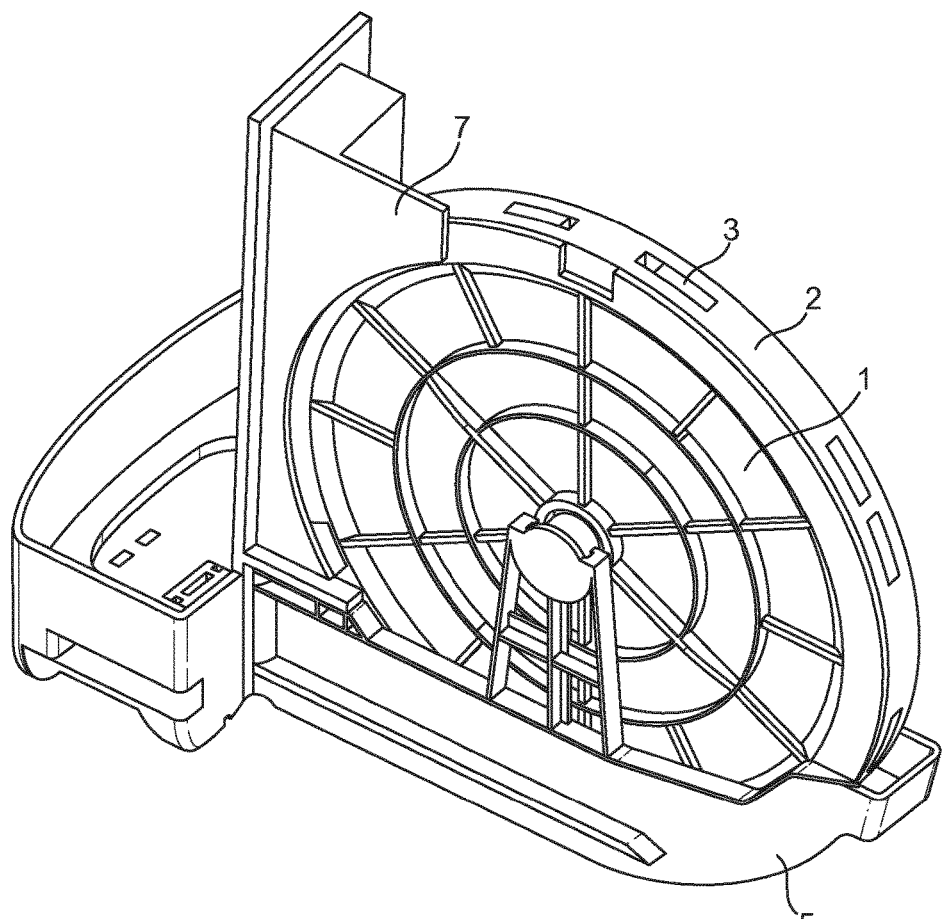
FIG. 4 shows a schematic view of one embodiment of the apparatus according to the invention.
Figure 5:
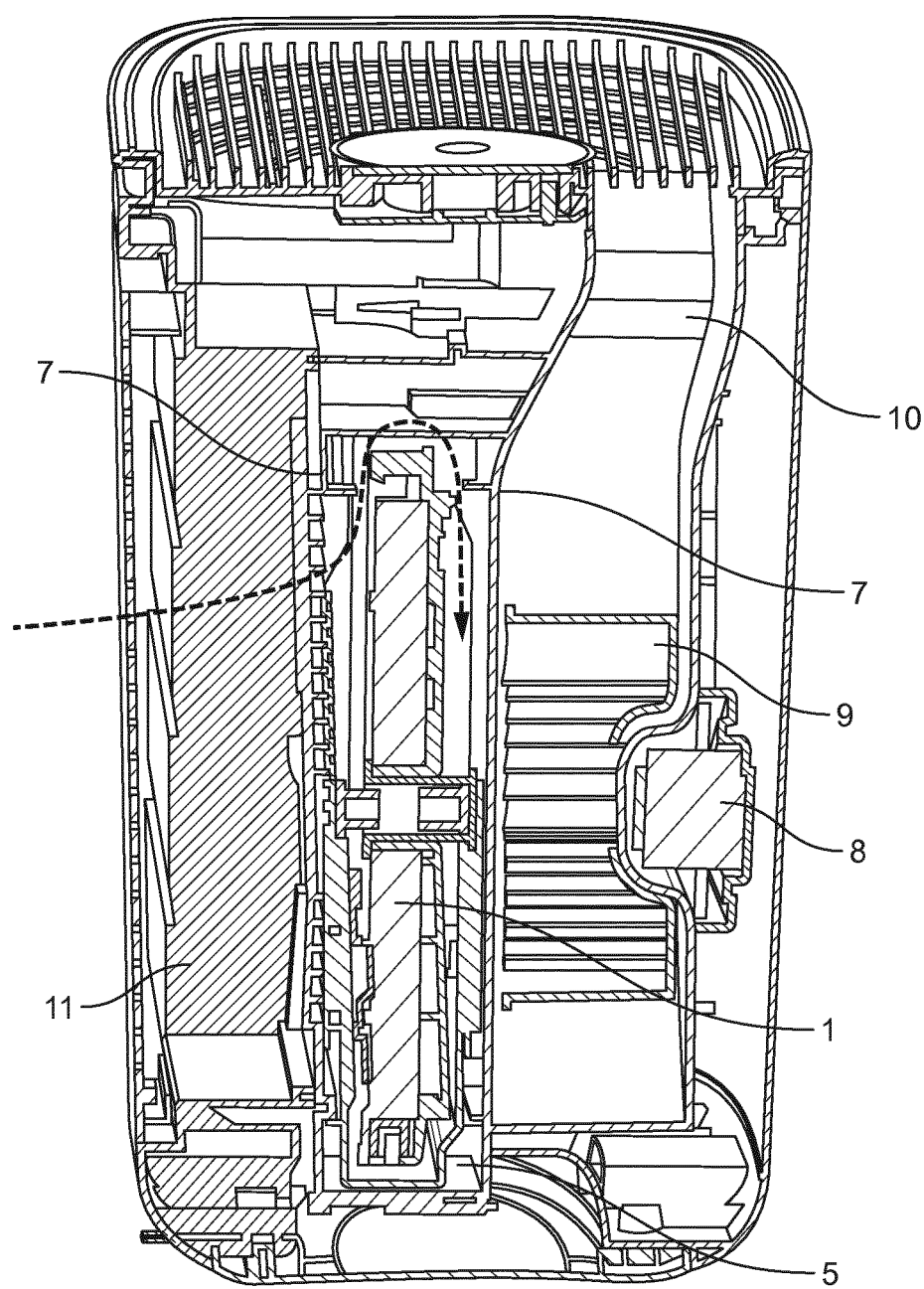
FIG. 5 shows a cross-sectional view of an apparatus according to one embodiment of the invention.
Figure 6:
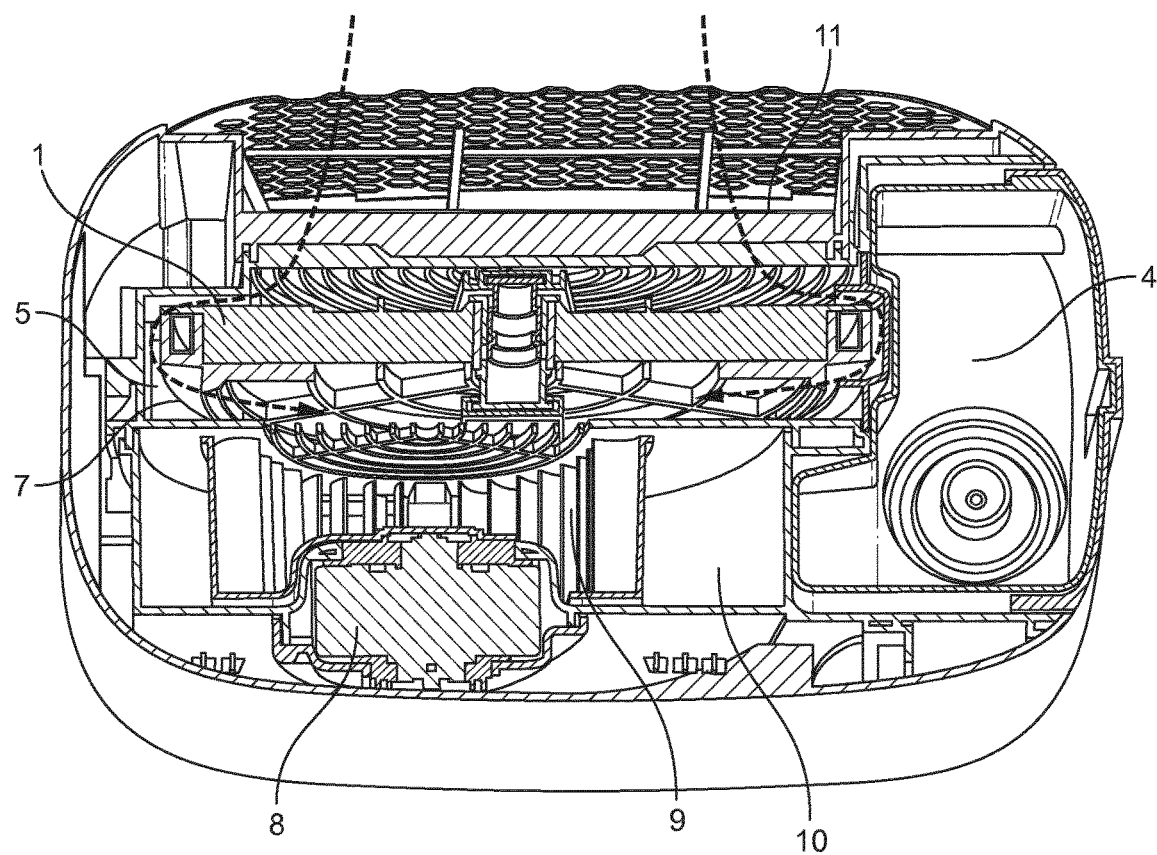
FIG. 6 shows a cross-sectional view of an apparatus according to one embodiment of the invention.

In some embodiments, the apparatus further comprises one or more ribs, as shown as feature 7 in FIGS. 4-6. Advantageously, the rib(s) occlude area(s) around the air-permeable rotary filter, via which air flow would otherwise leak instead of passing through the rotary filter (shown as a dotted line in FIGS. 5 and 6). Reduction of air flow leakage typically results in improved air humidification and cleaning performance, due to improved flow of the air via the intended pathway (i.e. through the filter).

As shown in FIG. 4, during use of the apparatus in humidification mode, the frame 2 rotates, causing the bucket (s) 3 to rotate and thus contact the filtration solution in the tray 5. The filtration solution is scooped into a bucket 3 and transported as rotation of the frame continues. The filtration solution is deposited over the air-permeable rotary filter 1 as the frame 2 rotates, thereby wetting the air-permeable rotary filter 1. Any excess filtration solution flows through the rotary filter structure and eventually drains back into the tray 5. As ambient air passes through the rotary filter, pollutant(s) react with the filtration solution located on and inside the rotary filter, and become removed from the air.

FIGS. 5 and 6 illustrate the location of the motor 8, fan rotor 9, fan scroll 10 and area in which a rotary filter, such as a conventional air-permeable pleated filter or corrugated filter, can be located 11.

Figure 7:
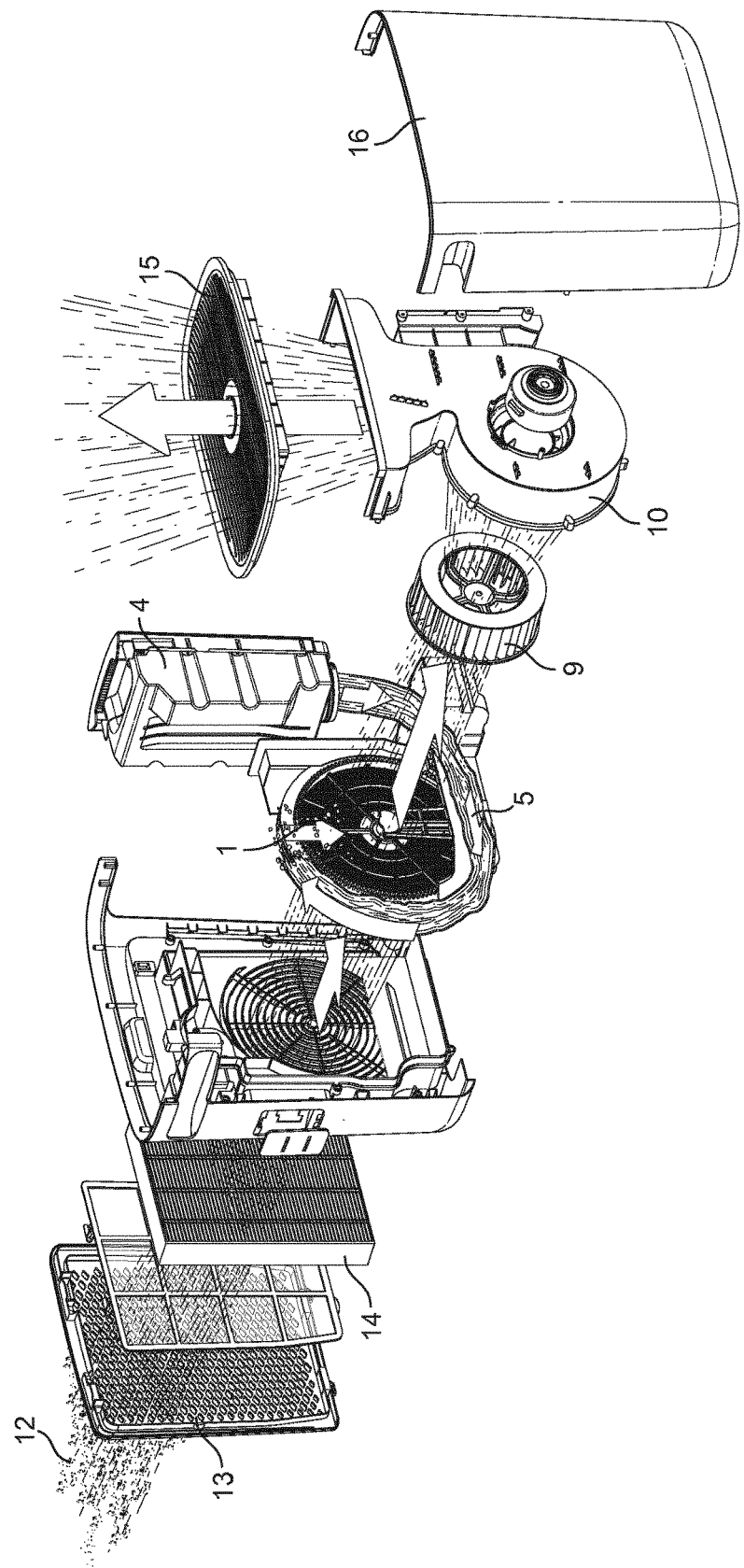
FIG. 7 shows a schematic view of an appliance comprising an embodiment of the invention.

FIG. 7 illustrates an appliance comprising an embodiment of the apparatus according to the present invention, comprising an air inlet 12, rear cover of the appliance 13, optional hepa filter 14, rotary filter 1, tank 4, tray 5, fan rotor 9, fan scroll 10, air outlet 15, and front cover of the appliance 16. Hepa is a well-known abbreviation of High Efficiency Particulate Arrestance/Air, see https://en.wikipedia.org/wiki/HEPA.

It should be noted that the terms "humidification and/or purification" and "humidifying and/or purifying" as used herein mean the processes of: purification alone; humidification alone; or purification and humidification.

It should be noted that the abbreviation "w/w %" is used herein to mean weight/weight percentage.

The above embodiments as described are only illustrative, and not intended to limit the technique approaches of the present invention. Although the present invention is described in detail referring to the preferable embodiments, those skilled in the art will understand that the technique approaches of the present invention can be modified or equally displaced without departing from the scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. An apparatus for humidifying and/or purifying air, the apparatus comprising:
   a rotary filter,
   a fan for passing air through the rotary filter, and
   a reservoir,
   wherein the settings of the fan and the rotation speed of the rotary filter are controlled by feedback from a humidity sensor,
   wherein:
   settings of the fan and the rotation speed of the rotary filter are further controlled by feedback from a gaseous pollutant sensor.

2. The apparatus according to claim 1, wherein the rotary filter comprises one or more hydrophilic materials.

3. The apparatus according to claim 2, wherein the rotary filter comprises one or more of ceramics, hydrophilic polymeric materials, hydrophilic fibrous materials, or hydrophilic paper.

4. The apparatus according to claim 1, wherein the rotary filter has a surface area with air of at least $0.1 \text{ m}^2$.

5. The apparatus according to claim 1, wherein the rotary filter has a corrugated or honeycomb structure, and wherein the corrugated or honeycomb structure comprises a plurality of open channels.

6. The apparatus according to claim 5, wherein the open channels have a length of at least 10 mm and/or a pore diameter of between 0.5-2 mm.

7. The apparatus according to claim 5, wherein the open channel walls are permeable to a filtration solution and no more than 1 mm thick.

8. The apparatus according to claim 1, wherein the rotary filter is controlled to rotate if the level of a gaseous pollutant sensed by the gaseous pollutant sensor is above a pre-set level.

9. The apparatus according to claim 1, further comprising a user reminder mechanism for indicating when to refill the reservoir, and wherein the user reminder mechanism is activated when a gaseous pollutant sensed by the gaseous pollutant sensor is above a pre-set level for a pre-set amount of time.

10. The apparatus according to claim 1, wherein the rotary filter is a chemisorption filter.

11. The apparatus according to claim 1, wherein the rotary filter is controlled to rotate and the fan is controlled to produce an air flow, when an ambient relative humidity level received from the humidity sensor is below a pre-determined humidity value.

12. The apparatus according to claim 1, wherein the rotary filter is controlled to intermittently rotate and wherein the fan is controlled to continuously produce an air flow, when the ambient relative humidity level received from the humidity sensor is above a pre-determined humidity value, and when a gaseous pollutant concentration level received from the gaseous pollutant sensor is above a pre-determined gaseous pollutant level.

13. The apparatus according to claim 1,
wherein the rotation of the rotary filter and the fan are controlled to be deactivated, when ambient relative humidity level received from the humidity sensor is above a pre-determined humidity value and when the gaseous pollutant concentration level received from the gaseous pollutant sensor is below a pre-determined gas pollutant level.

14. The apparatus according to claim 1, wherein the rotary filter is partly located in the reservoir.

15. A method of purifying and/or humidifying air, the method comprising:
rotating a rotary filter, thereby depositing a filtration solution onto the rotary filter and dispersing the deposited filtration solution through the interior of the rotary filter;
passing air through the rotary filter; and
controlling a rotation speed of the rotary filter and the air flow through the rotary filter in dependence upon an ambient relative humidity;
wherein:
controlling a rotation speed of the rotary filter and the air flow through the rotary filter is further dependent upon a gaseous pollutant concentration in the ambient air.

* * * * *